(12) United States Patent
Reinert et al.

(10) Patent No.: US 12,513,156 B2
(45) Date of Patent: Dec. 30, 2025

(54) DYNAMIC VERIFICATION OF AN ELECTRONIC EXCHANGE OF INFORMATION

(71) Applicant: Capital One Services, LLC, McLean, VA (US)

(72) Inventors: Owen Reinert, Queens, NY (US);
Galen Rafferty, Mahomet, IL (US);
Samuel Sharpe, Cambridge, MA (US);
Brian Barr, Schenectady, NY (US);
Michael Davis, Arlington, VA (US);
Justin Au-Yeung, Somerville, MA (US)

(73) Assignee: Capital One Services, LLC, McLean, VA (US)

( * ) Notice: Subject to any disclaimer, the term of this patent is extended or adjusted under 35 U.S.C. 154(b) by 153 days.

(21) Appl. No.: 18/500,919

(22) Filed: Nov. 2, 2023

(65) Prior Publication Data

US 2025/0150461 A1    May 8, 2025

(51) Int. Cl.
*H04L 9/40*    (2022.01)
*H04L 29/06*    (2006.01)

(52) U.S. Cl.
CPC .......... *H04L 63/123* (2013.01); *H04L 63/107* (2013.01)

(58) Field of Classification Search
CPC ..... H04L 63/123; H04L 63/107; H04L 63/10; H04L 63/108; H04L 63/14; H04L 63/1408; H04L 63/1425
See application file for complete search history.

(56) References Cited

U.S. PATENT DOCUMENTS

| | | | |
|---|---|---|---|
| 10,825,028 B1 * | 11/2020 | Kramme ................ | G06Q 20/24 |
| 2018/0234411 A1 * | 8/2018 | Masiero .............. | H04L 63/0853 |
| 2024/0257134 A1 * | 8/2024 | Kasthurirengan ... | G06Q 20/206 |

\* cited by examiner

*Primary Examiner* — Edward Zee
(74) *Attorney, Agent, or Firm* — Harrity & Harrity, LLP

(57) ABSTRACT

In some implementations, a verification device may receive a request for an electronic exchange of information. The verification device may receive geographic location information associated with the request for the electronic exchange of information. The verification device may determine, using a machine learning model and based on the geographic location information, a validity of the request for the electronic exchange of information. The verification device may determine whether to execute the electronic exchange of information based on the determination of the validity of the request for the electronic exchange of information. The verification device may perform one of executing the electronic exchange of information or rejecting the request for the electronic exchange of information based on the determination of whether to execute the electronic exchange of information.

20 Claims, 9 Drawing Sheets

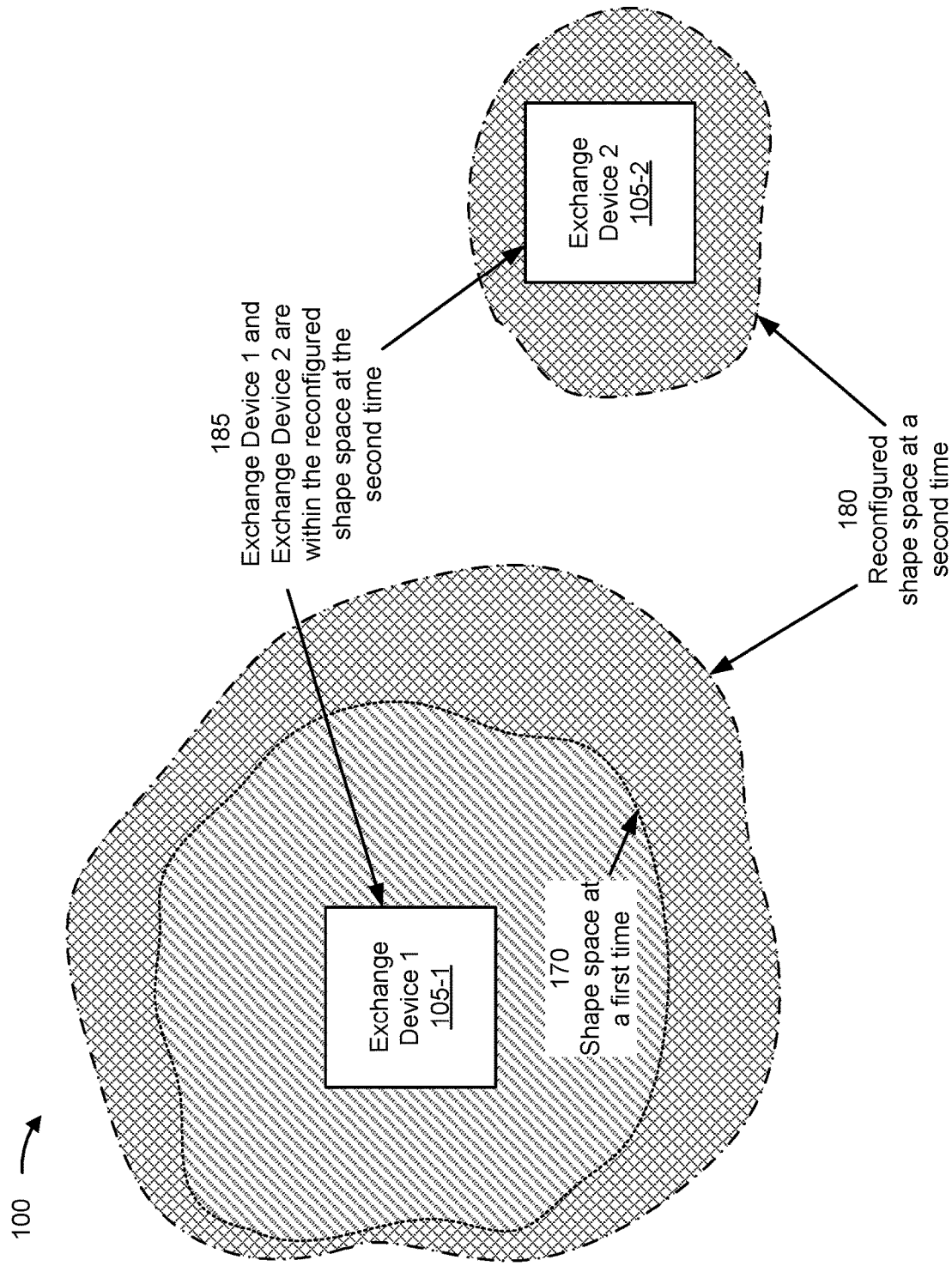

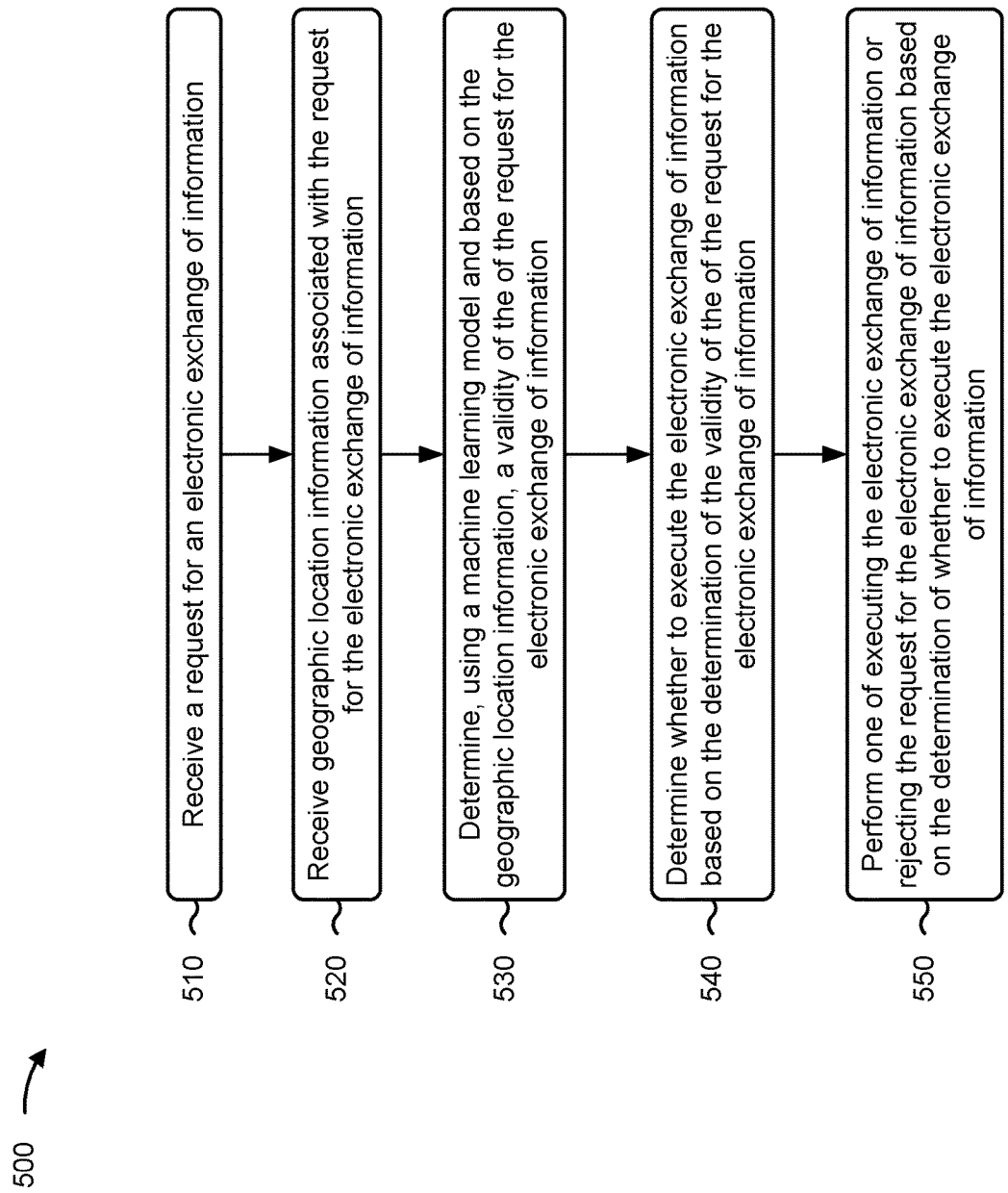

DYNAMIC VERIFICATION OF AN ELECTRONIC EXCHANGE OF INFORMATION

BACKGROUND

In some cases, to prevent fraudulent transactions from occurring, a user may be authenticated (e.g., verified as an authorized user) when engaging in a transaction (e.g., by entering security information, such as a personal identification number for a transaction account, providing a signature to authenticate the transaction, and/or the like). In some examples, a user may be authenticated based on a location of a transaction, such as whether the location of the transaction is within a certain proximity of a prior transaction.

SUMMARY

Some implementations described herein relate to a system for verifying an electronic exchange of information. The system may include one or more memories and one or more processors communicatively coupled to the one or more memories. The one or more processors may be configured to train a machine learning model based on multiple sets of electronic exchanges of information data and geographic location data associated with the multiple sets of electronic exchanges of information data. The one or more processors may be configured to receive a request for an electronic exchange of information. The one or more processors may be configured to receive geographic location information associated with the request for the electronic exchange of information. The one or more processors may be configured to determine, using the machine learning model and based on the geographic location information, a validity of the request for the electronic exchange of information. The one or more processors may be configured to determine whether to execute the electronic exchange of information based on the determination of the validity of the request for the electronic exchange of information. The one or more processors may be configured to perform one of executing the electronic exchange of information or rejecting the request for the electronic exchange of information based on the determination of whether to execute the electronic exchange of information.

Some implementations described herein relate to a method for verifying an electronic exchange of information. The method may include receiving, by a verification device, a request for an electronic exchange of information. The method may include receiving, by the verification device, geographic location information associated with the request for the electronic exchange of information. The method may include determining, using a machine learning model and based on the geographic location information, a validity of the request for the electronic exchange of information. The method may include determining, by the verification device, whether to execute the electronic exchange of information based on the determination of the validity of the request for the electronic exchange of information. The method may include performing, by the verification device, one of executing the electronic exchange of information or rejecting the request for the electronic exchange of information based on the determination of whether to execute the electronic exchange of information.

Some implementations described herein relate to a non-transitory computer-readable medium that stores a set of instructions. The set of instructions, when executed by one or more processors of a verification device, may cause the verification device to receive a request for an electronic exchange of information. The set of instructions, when executed by one or more processors of the verification device, may cause the verification device to receive geographic location information associated with the request for the electronic exchange of information. The set of instructions, when executed by one or more processors of the verification device, may cause the verification device to determine, using a machine learning model and based on the geographic location information, a validity of the request for the electronic exchange of information. The set of instructions, when executed by one or more processors of the verification device, may cause the verification device to determine whether to execute the electronic exchange of information based on the determination of the validity of the request for the electronic exchange of information. The set of instructions, when executed by one or more processors of the verification device, may cause the verification device to perform one of executing the electronic exchange of information or rejecting the request for the electronic exchange of information based on the determination of whether to execute the electronic exchange of information.

BRIEF DESCRIPTION OF THE DRAWINGS

FIGS. 1A, 1B, 1C, 1D, and 1E are diagrams of an example associated with dynamic verification of an electronic exchange of information, in accordance with some embodiments of the present disclosure.

FIG. 5 is a flowchart of an example process associated with dynamic verification of an electronic exchange of information, in accordance with some embodiments of the present disclosure.

DETAILED DESCRIPTION

Figure 1A:
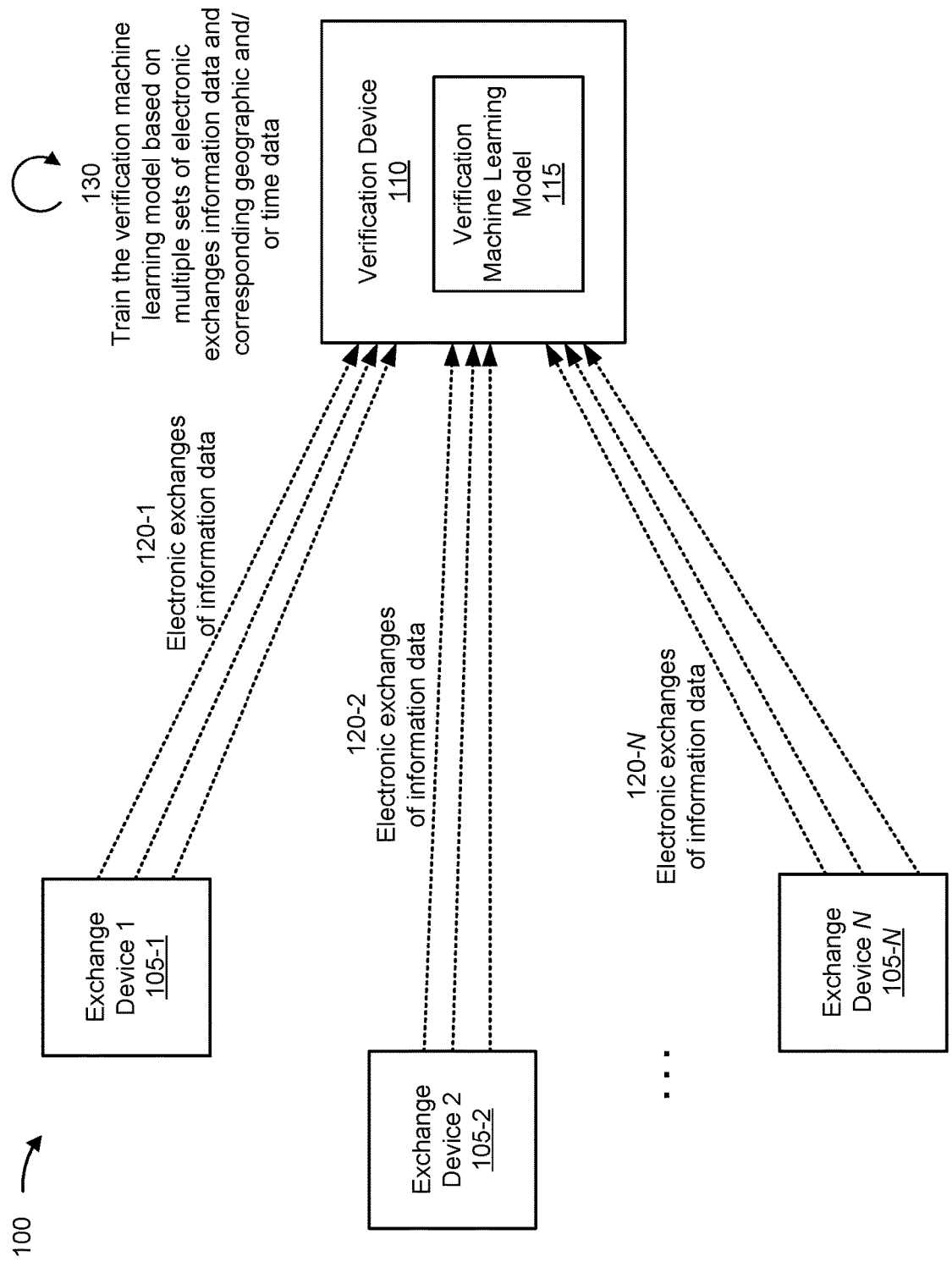

The following detailed description of example implementations refers to the accompanying drawings. The same reference numbers in different drawings may identify the same or similar elements.

Vast amounts of data may be stored electronically in data structures (e.g., databases, blockchains, log files, cookies, or the like). A device may perform multiple queries, or other information retrieval techniques, to unrelated data structures to obtain data relevant to a particular task or computational operation. Moreover, each data structure may employ a particular schema and/or use particular data formatting conventions for data storage. Thus, the data may be incompatible and difficult to integrate into machine-usable outputs for computational instructions or automation. This incompatibility may necessitate separate handling of the data using complex instructions and/or repetitive processing to achieve desired computational outcomes or automation outcomes, thereby expending significant computing resources (e.g., processor resources and/or memory resources) and causing significant delays. For example, verifying requests for electronic exchanges of information, such as for a purpose of preventing invalid and/or fraudulent electronic exchanges of information, may necessitate separate handling of the data using complex instructions and/or repetitive processing to achieve desired computational outcomes or automation outcomes, thereby expending significant computing resources (e.g., processor resources and/or memory resources) and causing significant delays.

In addition, separate use of the data, such as individually presenting the data in a user interface for analysis by a user, may be inefficient. For example, the device may separately process and/or reformat data from different data structures to obtain information for presenting in the user interface, thereby expending significant computing resources. Furthermore, individually presenting the data may increase the size of a user interface (e.g., a web page) or utilize multiple user interfaces (e.g., multiple web pages). Navigating through a large user interface or a large number of user interfaces to find relevant information creates a poor user experience, consumes excessive computing resources that are needed for a client device to generate and display the user interface(s) and that are needed for one or more server devices to serve the user interface(s) to the client device, and consumes excessive network resources that are needed for communications between the client device and the server device.

Some implementations described herein enable integration of otherwise incompatible data from multiple unrelated data structures. In some implementations, a system may train a machine learning model based on multiple sets of electronic exchanges of information data and/or geographic location data associated with the multiple sets of electronic exchanges of information data, and/or the system may use the machine learning model to predict a validity of a request for an electronic exchange of information based on geographic location information associated with the request. For example, the machine learning model may determine whether to execute the electronic exchange of information based on data relating to a location of a user associated with the request for the electronic exchange of information, a location of a prior electronic exchange of information associated with the user, an elapsed time since a prior electronic exchange of information associated with the user, a type of the requested electronic exchange of information and/or the prior electronic exchange of information, or similar information. Based on the determination whether to execute the electronic exchange of information, the system may execute or reject the electronic exchange of information.

In this way, the machine learning model enables the system to perform operations based on otherwise incompatible data while conserving computing resources and reducing delays that would otherwise result from separate handling of the data using complex instructions and/or repetitive processing. Moreover, an output of the machine learning model may convey data from the multiple unrelated databases in a smaller user interface or in a lesser number of user interfaces than otherwise would have been used to individually present data from the multiple unrelated databases. In this way, the use of computing resources and network resources is reduced in connection with serving, generating, and/or displaying the user interface(s).

FIGS. 1A-1E are diagrams of an example 100 associated with dynamic verification of an electronic exchange of information. As shown in FIGS. 1A-1E, example 100 includes one or more exchange devices 105 (shown in FIGS. 1A-1E as a first exchange device 105-1 through an N-th exchange device 105-N), and a verification device 110, which may include, or which may otherwise be associated with, a verification machine learning model 115. These devices are described in more detail in connection with FIGS. 2-4.

As shown in FIG. 1A, the verification device 110 may be capable of receiving data associated with electronic exchanges of information, such as electronic transactions, transaction-card based purchases or refunds (e.g., purchases or refunds associated with a credit card, a debit card, a bank card, or a similar transaction card), electronic transfers of assets, or other electronic exchanges of information. For example, in some implementations, based on geographic data, time data, and/or similar data, the verification device 110 may determine whether certain electronic exchanges of information (e.g., transactions) are likely to have been initiated by an authorized user (e.g., an owner of a transaction card, or the like). In instances in which the verification device 110 determines that a particular electronic exchange of information was initiated by an authorized user, the verification device 110 may validate and/or approve the electronic exchange of information. However, in instances in which the verification device 110 determines that the particular electronic exchange of information was not initiated by an authorized user, is a fraudulent electronic exchange of information, or makes a similar determination, the verification device 110 may decline and/or reject the transaction.

In some examples, electronic exchanges of information (e.g., electronic transactions, electronic transfers of assets, or the like) may be verified and/or validated using a polygon space, a geo-fence, or a similar shape space. For example, when a user initiates a transaction at a first location, a verification system may configure, in a latitude/longitude grid or the like, a polygon around that location, and may determine if subsequent transactions are valid and/or non-fraudulent based on whether the subsequent transactions occur within the polygon space. More particularly, if a subsequent transaction occurs within the polygon space, the verification system may determine that the subsequent transaction was likely initiated by a same user as the first transaction due to a close proximity of the two transactions, and thus the verification system may verify and/or approve the transaction. On the other hand, if a subsequent transaction does not occur within the polygon space, the verification system may determine that the subsequent transaction was not initiated by a same user as the first transaction due to the distance between the two transactions, and thus may decline and/or reject the transaction.

Use of a static polygon space, such as in the example described above, may result in false negatives and/or false positives (e.g., either approval of fraudulent transactions or rejection of valid transactions), due to the limited intelligence employed in such verification determinations. Additionally, or alternatively, use of a static polygon space may be time and/or resource intensive. For example, the verification system may be required to process large amounts of data to make ad hoc polygon determinations, and/or may expend numerous time, power, computing, and network resources reversing and/or correcting incorrect verification determinations.

According to some implementations, the verification device 110 may be configured to perform dynamic and/or intelligent verification of electronic exchanges of information, such as for a purpose of reducing an error rate associated with verifying electronic exchanges of information. Reducing an error rate associated with verifying electronic exchanges of information may conserve time, power, computing, and network resources otherwise required to reverse and/or correct errant verification determinations. In some implementations, the verification device 110 may be configured to train and/or use a machine learning model, such as the verification machine learning model 115 shown in FIG. 1A, thereby resulting in adaptive verification decisions and/or continual improvement in verifying electronic exchanges of information.

More particularly, as shown in FIG. 1A, and as indicated by reference number 120, the verification device 110 may be configured to collect data associated with multiple electronic exchanges of information (e.g., multiple electronic transactions) from multiple exchange devices 105. More particularly, as indicated by reference number 120-1, the verification device 110 may be configured to receive data associated with electronic exchanges of information associated with the first electronic exchange device 105-1; as indicated by reference number 120-2, the verification device 110 may be configured to receive data associated with electronic exchanges of information associated with the second electronic exchange device 105-1; and/or, as indicated by reference number 120-N, the verification device 110 may be configured to receive data associated with electronic exchanges of information associated with the N-th electronic exchange device 105-N.

As described in more detail elsewhere herein, each exchange device 105 may be a device capable of facilitating an electronic exchange of information. For example, for electronic exchanges of information associated with a purchase at a retail establishment, an exchange device 105 may be associated with a point-of-sale (POS) terminal or a similar device configured to read a transaction card (e.g., a credit card, a debit card, a bank card, and/or a similar card) and extract user information (e.g., account information) therefrom. For electronic exchanges of information associated with an online purchase via a website, an exchange device 105 may be associated with a personal computer, a mobile device, a server, or a similar device that is associated with a user inputting transaction card data in web form or a similar data input structure.

The data associated with the multiple electronic exchanges of information may be data indicating a user associated with each electronic exchange of information, a location associated with each electronic exchange of information, a time associated with each electronic exchange of information, a type of exchange performed for each electronic exchange of information, and/or similar data. For example, for each electronic exchange of information, the data may identify a user that initiated the electronic exchange of information, a geographic location of the exchange device 105 where the electronic exchange of information was initiated (e.g., a latitude/longitude location of a PoS terminal, an Internet protocol (IP) address of a personal computer or mobile device, or the like), a timestamp indicating a time at which the electronic exchange of information was initiated, and/or a type of the electronic exchange of information (e.g., an indication that the electronic exchange of information was associated with a purchase, an indication of items purchased via the electronic exchange of information, an indication that the electronic exchange of information was associated with a refund, an indication that the electronic exchange of information was electronic transfer of funds, or the like).

In this way, the data associated with the multiple electronic exchanges of information may be indicative of typical user behavior, patterns, capabilities, or the like. For example, electronic exchanges of information data associated with a single user may be indicative of feasible electronic exchanges of information by other users. For example, if the electronic exchange of information data indicates that a first user used a transaction card to book airline tickets from New York City to Phoenix, to purchase a coffee in a New York City airport, and to buy lunch in a Phoenix airport six hours later, the data may be indicative that other users traveling from New York City to Phoenix may validly initiate distant transactions only five or six hours apart from one another. On the other hand, the same data may indicate that transactions initiated in New York City and Phoenix within two hours of one another are invalid and/or fraudulent.

As indicated by reference number 130, in some implementations the verification device 110 may train the verification machine learning model 115 based on the multiple sets of electronic exchanges of information data, geographic location data associated with the multiple sets of electronic exchanges of information data, time data associated with the multiple sets of electronic exchanges of information data, type data associated with the multiple sets of electronic exchanges of information data, and/or similar data associated with the multiple sets of electronic exchanges of information data. In some other implementations, a different device (e.g., a device associated with a cloud computing system described herein) may train the verification machine learning model 115 based on the multiple sets of electronic exchanges of information data, geographic location data associated with the multiple sets of electronic exchanges of information data, time data associated with the multiple sets of electronic exchanges of information data, type data associated with the multiple sets of electronic exchanges of information data, and/or similar data associated with the multiple sets of electronic exchanges of information data.

In this way, the verification machine learning model 115 may be trained to predict whether a certain electronic exchange of information initiated by a user is valid and/or non-fraudulent based on certain inputs, such as a difference in geographic location between the electronic exchange of information and a prior electronic exchange of information initiated by the user, an elapsed time between the two electronic exchanges of information, a type of electronic exchange of information associated with one or both of the electronic exchanges of information, a movement of the user during a period of time between the two electronic exchanges of information, or similar inputs. Aspects of training the verification machine learning model 115 are described in more detail below in connection with FIG. 2.

Figure 1B:
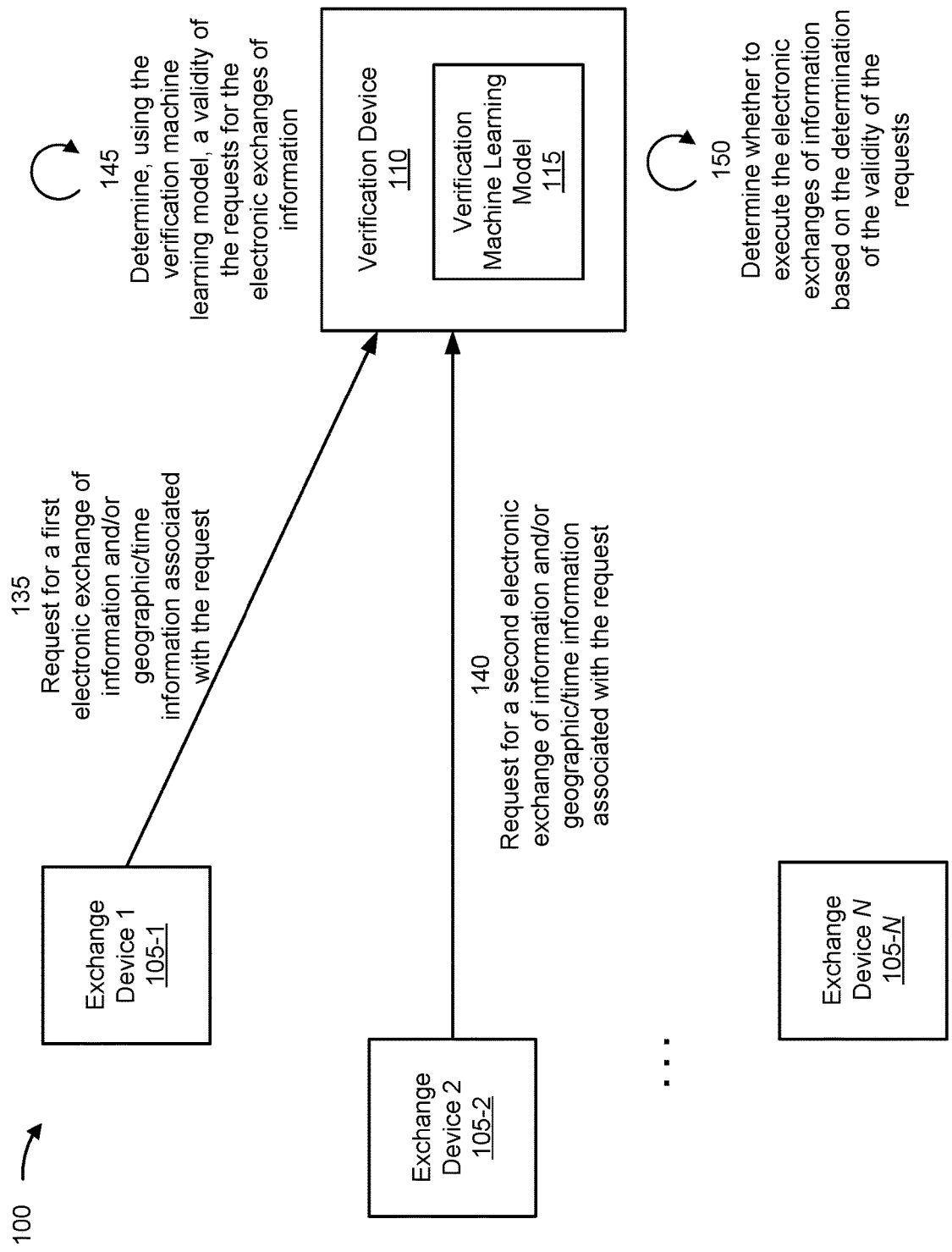

More particularly, as shown in FIG. 1B, and as indicated by reference numbers 135 and 140, the verification device 110 may receive, from one or more exchange devices 105, requests for electronic exchanges of information. That is, as indicated by reference number 135, the verification device 110 may receive, from the first exchange device 105-1, a request for a first electronic exchange of information, and, as indicated by reference number 140, the verification device 110 may receive, from the second exchange device 105-2, a request for a second electronic exchange of information.

Moreover, the verification device 110 may receive additional data and/or information indicative of certain characteristics of each request for electronic exchange of information. For example, the verification device 110 may receive geographic location information associated with the requests for the electronic exchanges of information. More particularly, for in-person-initiated electronic exchanges of information (e.g., a transaction in a retail store, or the like), the geographic location information may be associated with a physical location (e.g., latitude/longitude coordinates of the physical location, global navigation satellite system (GNSS) coordinates of the physical location, a street address of the physical location, or similar information), such as a physical location of a PoS device associated with the electronic exchange of information. Additionally, or alternatively, for digitally-initiated electronic exchanges of information (e.g., an online purchase, or the like), the geographic location information may be associated with an IP address corresponding to a device associated with the electronic exchange of information (e.g., a personal computer, a mobile device, or the like).

Additionally, or alternatively, the verification device 110 may receive time and/or location information associated with the requests for the electronic exchange of information. For example, the verification device 110 may receive timestamps or similar data indicating a time at which each electronic exchange of information was initiated. Additionally, or alternatively, the verification device 110 may receive movement information, such as information associated with a movement of the user initiating the requests for the electronic exchanges of information. For example, the movement information may include GNSS data associated with a movement of a telecommunication device (e.g., a smartphone) associated with the user, asynchronous speedometer data indicating a speed of the user's movements (e.g., such as via a speedometer associated with the user's telecommunication device), or the like. Additionally, or alternatively, the verification device 110 may receive type information associated with a type of the electronic exchanges of information. For example, for electronic exchanges of information corresponding to purchases or similar transactions, the type information may indicate a type of purchase made (e.g., an indication that airline tickets were purchased, train tickets were purchased, hotel reservations were performed, or the like), which may be indicative of a user's behavior (e.g., the type information may indicate that a user is planning to travel to a given city, or the like).

As indicated by reference number 145, based on the information received from the one or more exchange devices 105, the verification device 110 may determine a validity of a request for the electronic exchange of information. In some implementations, the verification device 110 may determine the validity of the request for the electronic exchange of information using the verification machine learning model 115, such as by inputting the geographic location information, the time information, the movement information, the type information, and/or similar information into the verification machine learning model 115. Put another way, the verification machine learning model 115 may be capable of learning how users travel from certain locations to other locations over a given period of time, and thus may be capable of predicting whether a certain request for an electronic exchange of information is valid and/or non-fraudulent based on data associated with a user's prior electronic exchanges of information.

Returning to the above example in which the first request for electronic exchange of information is associated with a transaction in New York and the second request for electronic exchange of information is associated with a transaction in Phoenix, the verification machine learning model 115 may predict that the two transactions are valid (e.g., initiated by the same, authorized user) when the transactions occur six or more hours apart from one another, because the data on which the verification machine learning model 115 was trained may indicate that it is common for users to travel from New York City to Phoenix, that it is common for users that are travelling between such cities to do so in just over five hours, and/or that users traveling from New York City to Phoenix typically make purchases within the respective airports about six hours apart from one another. This prediction may be augmented by additional data, such as speedometer data indicating that the user was moving at speeds consistent with airplane travel, GNSS data indicating the user was moving across the country consistent with a typical flight path from New York City to Phoenix, or the like. On the other hand, the verification machine learning model 115 may predict that the two transactions are invalid and/or fraudulent (e.g., not initiated by the same, authorized user) when the transactions occur less than five hours apart from one another, because the data on which the verification machine learning model 115 was trained may indicate that, using all available transportation modes, travel from New York City to Phoenix requires at least five hours of travel time. This prediction may be further augmented by additional data, such as speedometer data indicative that the user was not moving at speeds that could complete a New York City to Phoenix trip in two hours, GNSS data indicating the user was relatively stationary during the two hours between transactions, or the like.

As indicated by reference number 150, the verification device 110 may determine whether to execute one or more electronic exchanges of information based on the respective determinations of the validity of the request for the electronic exchange of information. For example, in implementations in which the verification device 110 determined that the request for the first electronic exchange of information and/or the request for the second electronic exchange of information was valid and/or non-fraudulent, the verification device 110 may determine to execute the first electronic exchange of information and/or the second electronic exchange of information. Conversely, in implementations in which the verification device 110 determined that the request for the first electronic exchange of information and/or the request for the second electronic exchange of information was invalid and/or fraudulent, the verification device 110 may determine to not execute the first electronic exchange of information and/or the second electronic exchange of information.

Figure 1C:
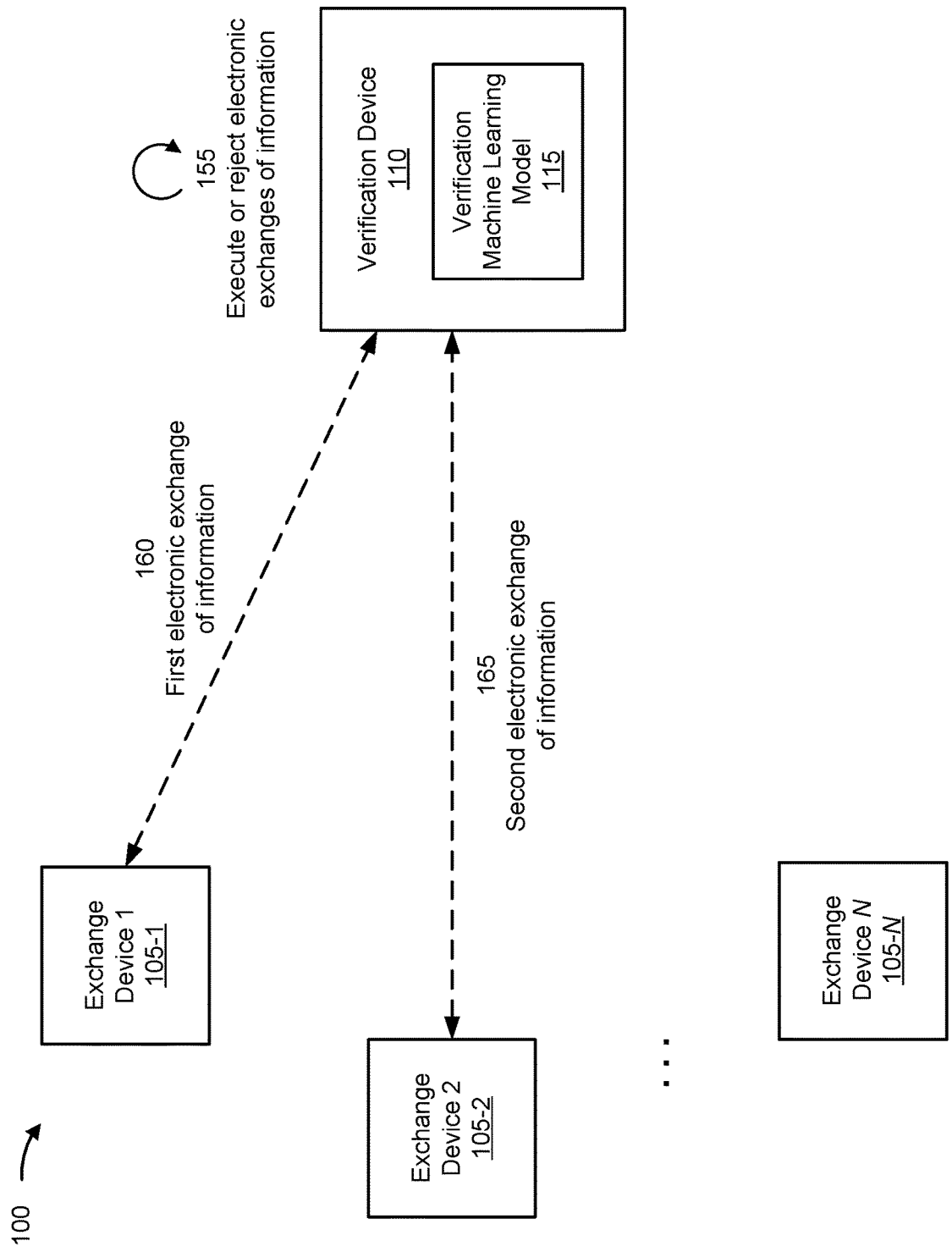

As shown in FIG. 1C, and as indicated by reference number 155, the verification device 110 may thus execute one or more electronic exchanges of information and/or reject one or more electronic exchanges of information based on the determination of whether to execute the electronic exchanges of information. For example, in implementations in which the verification device 110 determined that the first electronic exchange of information is to be executed, the verification device 110 may execute the first electronic exchange of information, as indicated by reference number 160. Similarly, in implementations in which the verification device 110 determined that the second electronic exchange of information is to be executed, the verification device 110 may execute the second electronic exchange of information, as indicated by reference number 165. Moreover, for any request that the verification device 110 determined to be invalid and/or fraudulent, the verification may reject the electronic exchange of information. For example, in implementations in which the verification device 110 determined that the first electronic exchange of information is not to be executed, the verification device 110 may reject the request for the first electronic exchange of information, as indicated by reference number 160. Similarly, in implementations in which the verification device 110 determined that the second electronic exchange of information is not to be executed, the verification device 110 may reject the request the second electronic exchange of information, as indicated by reference number 165.

Although the example implementation described above in connection with FIGS. 1A-1C involve the verification device 110 determining whether to approve or reject a request for an electronic exchange of information using the verification machine learning model 115, in some other implementations the verification device 110 may perform a validity determination using other processes instead of, or in addition to, using the verification machine learning model 115. For example, in some implementations, the verification device 110 may determine a validity of one or more requests for electronic exchange of information, determine whether to execute one or more electronic exchanges of information, and/or execute or reject one or more electronic exchanges of information based on a dynamic and/or reconfigurable shape space associated with a location grid.

For example, in some implementations, the verification device 110 may create a location grid, such as a latitude/longitude grid. Based on data received from the exchange devices 105 or from similar sources, the verification device 110 may aggregate available modes of transportation (e.g., flights, cars, trains, boats, or the like) at each location in the grid, and/or destinations associated with the available modes of transportation and/or for each location in the grid. For example, a user may not be capable of quickly traveling to all other points on the grid, but rather only locations associated with airports, high-speed train stations, harbors, or the like. Accordingly, based on the location grid and/or the aggregated modes of the transportation associated with the location grid, the verification device 110 may verify requests for electronic exchanges of information by configuring a dynamic shape space on the grid. For example, the verification device, taking into account velocity limits, flight restrictions, or similar information, may create a shape space (e.g., a polygon boundary) that encompasses locations in which electronic exchanges of information are likely to be non-fraudulent and thus valid. In some implementations, the shape space (e.g., polygon boundary) may grow over time, such as proportionally to a maximum velocity of available transportation in a given direction.

Figure 1D:
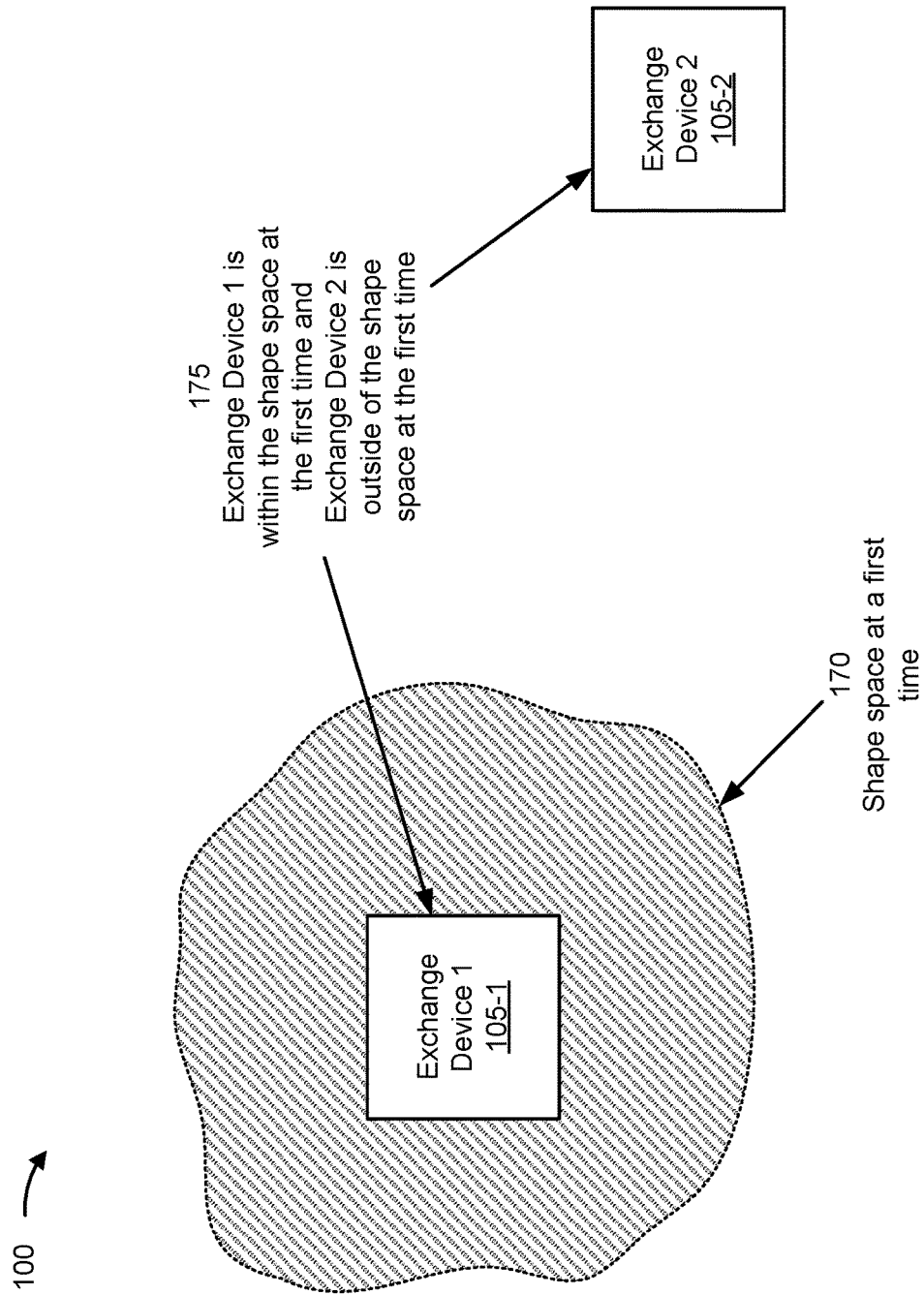

For example, FIGS. 1D and 1E depict an example of a dynamically configurable shape space encompassing areas associated with permitted electronic exchanges of information that may grow or otherwise change over time. In such implementations, the verification device 110 may determine a validity of one or more requests for electronic exchange of information, determine whether to execute one or more electronic exchanges of information, and/or execute or reject one or more electronic exchanges of information based on the dynamically configurable shape space (e.g., based on whether a location of a certain electronic exchange of information falls within the shape space).

More particularly, as shown in FIG. 1D, the verification device 110 may identify a shape space associated with permitted electronic exchanges of information by a particular user. In some implementations, the shape space may be associated with a prior electronic exchange of information (e.g., a prior transaction) associated with the user. For example, upon initiating a valid electronic exchange of information (e.g., an electronic exchange of information that has been validated and/or verified by the verification device 110), the verification device 110 may identify a shape space that dynamically changes and/or reconfigures with the passage of time. For example, based on available modes of transportation, velocity limits, and/or other restrictions associated with the available modes of transportation, the boundary of the shape space may grow with the passage of time, reflective that the user may move from a location where a first electronic exchange of information was initiated to another location associated with a subsequent electronic exchange of information.

In this regard, at a first time (shown in FIG. 1D), certain exchange devices 105 may be within the shape space while certain other exchange devices 105 may be outside of the shape space. More particularly, in the example shown in FIG. 1D, and as indicated by reference number 170, the shape space at a first time may generally surround the first exchange device 105-1 but not other exchange devices 105. More particularly, as indicated by reference number 175, at the first time, the first exchange device 105-1 may be within the shape space (e.g., encompassed by the boundary of the shape space), but the second exchange device 105-2 may be outside of the shape space. Accordingly, at the first time, if the verification device 110 receives a request for an electronic exchange of information from the first exchange device 105-1 (which is within the shape space), the verification device 110 may validate and/or verify the request. However, if, at the first time, the verification device 110 receives a request for an electronic exchange of information from the second exchange device 105-2 (which is outside of the shape space), the verification device 110 may reject the request as invalid and/or fraudulent.

As time passes, the shape space may be reconfigured to have a different boundary that encompasses more space, reflective that a user may have traveled farther away from a location of an initial electronic exchange of information over the additional elapsed time. Put another way, the verification device 110 may be configured to reconfigure a boundary of the shape space associated with permitted electronic exchanges of information as time passes.

For example, as shown in FIG. 1E, reference number 180 shows the shape space at a second time, which may be time that occurs after the first time. At this instance, the shape space may have grown, reflective that the user may have had an opportunity to travel farther away from the location of the initial electronic exchange of information as more time elapsed. More particularly, as indicated by the portion of the shape space surrounding the first exchange device 105-1, the shape space surrounding the first exchange device 105-1 may have expanded from the first time to the second time. Moreover, as indicated by the portion of the shape space surrounding the second exchange device 105-2, the shape space may now surround other locations, which may be reflective that the user could have traveled between two separate and distinct locations during an elapsed time from the initial electronic exchange of information. For example, in the example depicted in FIG. 1E, the portion of the shape space surrounding the second exchange device 105-2, which may be separate and distinct from the portion of the shape space surrounding the first exchange device 105-1, may indicate that the user may have flown from a location near the first exchange device 105-1 to a location near the second exchange device 105-2 during the elapsed time.

Accordingly, as indicated by reference number 185, both the first exchange device 105-1 and the second exchange device 105-2 are within the shape space at the second time. In this way, at the second time, if the verification device 110 receives a request for an electronic exchange of information from the first exchange device 105-1 (which is still within the shape space), the verification device 110 may validate and/or verify the request. Moreover, if, at the second time, the verification device 110 receives a request for an electronic exchange of information from the second exchange device 105-2 (which is now also encompassed by the shape space), the verification device 110 may validate and/or verify the request.

By using a verification machine learning model 115, a reconfigurable shape space, and/or a similar method for verifying electronic exchanges of information, the verification device 110 may conserve power, computing, and/or network resources as compared to traditional methods of verifying electronic exchanges of information. More particularly, by using a verification machine learning model 115, a reconfigurable shape space, and/or a similar method for verifying electronic exchanges of information, electronic exchanges of information may be improved and/or more readily verified, thereby reducing power, computing, and network resource consumption associated with reversing invalid electronic exchanges of information and/or verifying electronic exchanges of information using known verification systems.

As indicated above, FIGS. 1A-1E are provided as an example. Other examples may differ from what is described with regard to FIGS. 1A-1E.

Figure 2:
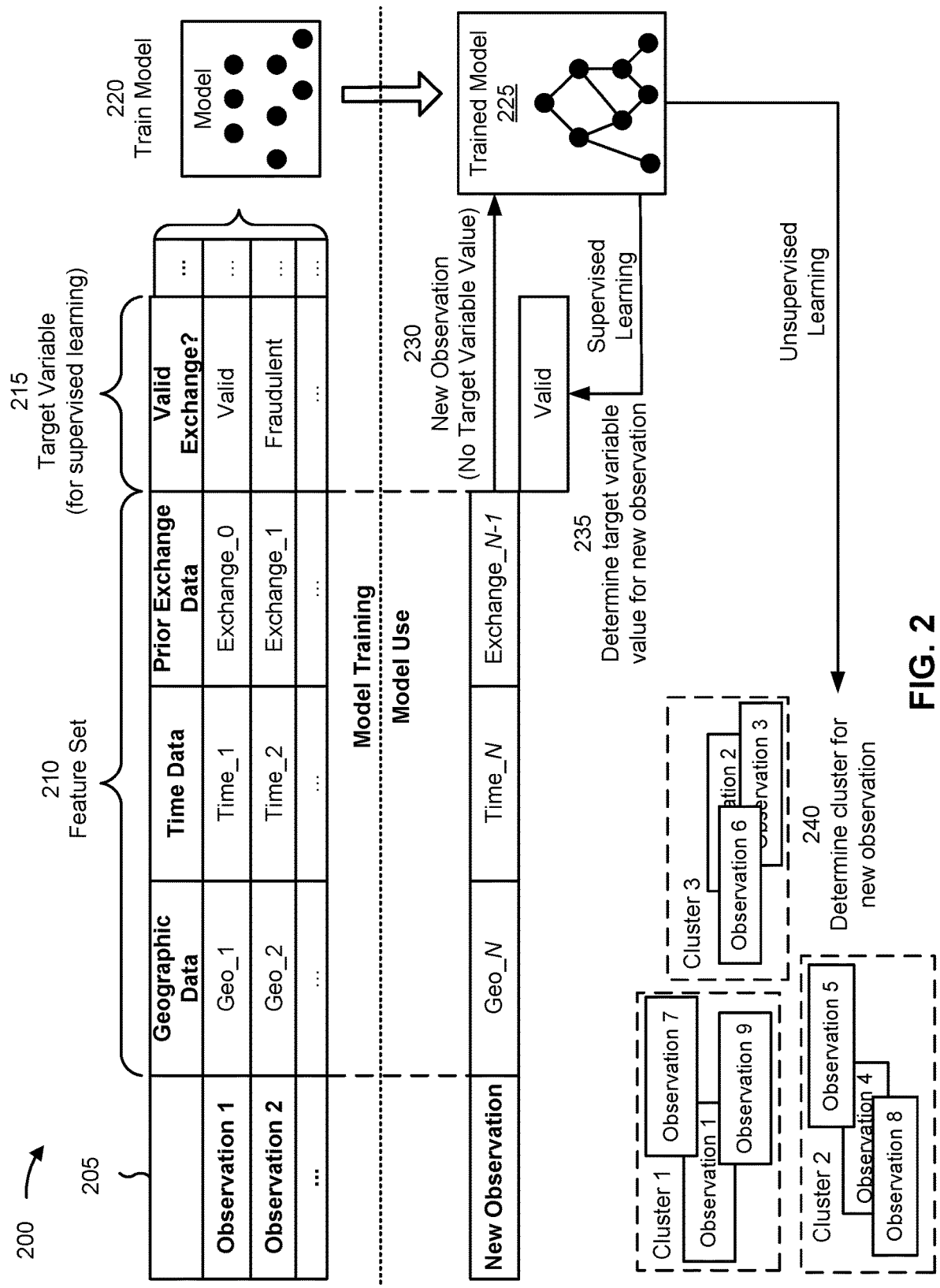
FIG. 2 is a diagram illustrating an example of training and using a machine learning model in connection with dynamic verification of an electronic exchange of information, in accordance with some embodiments of the present disclosure.

FIG. 2 is a diagram illustrating an example 200 of training and using a machine learning model in connection with dynamic verification of an electronic exchange of information. The machine learning model training and usage described herein may be performed using a machine learning system. The machine learning system, which may correspond to the verification machine learning model 115 described above in connection with FIGS. 1A-1E, may include or may be included in a computing device, a server, a cloud computing environment, or the like, such as the electronic exchange verification system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from one or more exchange devices (e.g., exchange devices 105), as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from one or more exchange devices (e.g., exchange devices 105). For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of geographic data associated with an electronic exchange of information (e.g., a location of the electronic exchange of information, such as latitude and/or longitude data, GNSS data, IP address data, or the like), a second feature of time data associated with an electronic exchange of information (e.g., a time at which the electronic exchange of information was initiated), a third feature of prior exchange data associated with an electronic exchange of information (e.g., data associated with a prior electronic exchange of information that precedes the electronic exchange of information, such as geographic data associated with the prior electronic exchange of information, time data associated with the prior electronic exchange of information, or the like), and so on. As shown, for a first observation, the first feature may have a value of Geo_1 (e.g., a latitude and/or longitude within New York City), the second feature may have a value of Time_1 (e.g., 2:00 pm on a particular day), the third feature may have a value of Exchange_0 (e.g., data indicating that a prior electronic exchange of information occurred within New York City at noon on the particular day), and so on. These features and feature values are provided as examples, and may differ in other examples. For example, the feature set may include one or more of the following features: a type of electronic exchange of information (e.g., for electronic exchanges of information associated with transactions, a type of item and/or service purchased, or the like), movement data associated with a user associated with the electronic exchange of information (e.g., GNSS data, asynchronous speedometer data, or the like), or similar data.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, or labels), and/or may represent a variable having a Boolean value. A target variable may be associated with a target variable value, and a target variable value may be specific to an observation. In example 200, the target variable is whether the electronic exchange of information is valid (e.g., non-fraudulent) or fraudulent (e.g., invalid), which has a value of "valid" for the first observation. More particularly, in this example, the electronic exchange of information may be a valid electronic exchange of information because it occurred within a reasonable proximity of a prior electronic exchange of information (e.g., both occurred within New York City) and within a reasonable time of a prior electronic exchange of information (e.g., both occurred within two hours), indicative that both electronic exchanges of information were initiated by the same, authorized user.

On the other hand, for a second observation, the first feature may have a value of Geo_2 (e.g., a latitude and/or longitude within Los Angeles), the second feature may have a value of Time_1 (e.g., 4:00 pm on a particular day), the third feature may have a value of Exchange_1 (e.g., data indicating that a prior electronic exchange of information occurred within New York City at 2:00 pm on the particular day), and so on. In this case, the target variable may have a value of "fraudulent," because the electronic exchange of information did not occur within a reasonable proximity of a prior electronic exchange of information (e.g., one exchange occurred in Los Angeles while the other occurred in New York City) and/or within a reasonable time of a prior electronic exchange of information (e.g., the exchanges occurred only one hour apart, which is not enough time to travel to Los Angeles from New York City), which may be indicative that both electronic exchanges of information were not initiated by the same, authorized user.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on multiple electronic transactions associated with multiple transaction cards (e.g., debit cards, credit cards, bank cards, or the like) and/or multiple users. During each transaction, various exchange devices (e.g., exchange devices 105), such as PoS terminals, personal computers, mobile devices, or similar devices, may collect data associated with the transaction, such as time data associated with the transaction (e.g., a timestamp corresponding to when the transaction was initiated) and/or geographical data associated with the transaction (e.g., a location of the user and/or transaction card initiating the transaction). For in-person transactions, the geographical data may be associated with a physical location of an establishment (e.g., a retail store) associated with a PoS terminal or a similar exchange device. For electronic transactions, the geographical data may be associated with an IP address of a customer device used to initiate the transaction, a GNSS location of a customer device used to initiate the transaction, or the like. In some implementations, automated and/or recurring transactions may be excluded from the data set, because such automated and/or recurring transactions may be validly initiated at a location distant from a user. Additionally, or alternatively, asynchronous speedometer measurements or similar measurement data associated with a user's mobile telecommunication device (e.g., a smartphone) may also be collected for at least some of the transactions, and/or a user's purchase history (e.g., whether the user purchased airline tickets, whether the user made hotel reservations in a certain city, or the like) may also be collected for at least some of the transactions.

The machine learning data may be trained based on the above-described transaction data in order to learn how users move over time, such as to learn how users typically move from one physical location (e.g., a first latitude and/or longitude) to another physical location (e.g., a second latitude and/or longitude) over a given period of time. In some implementations, the machine learning model may thus be used to predict whether a certain transaction is a valid transaction (e.g., initiated by an owner of the card) and thus should be executed, or whether the certain transaction is a fraudulent transaction (e.g., initiated by someone else other than the owner of the card) and thus should be rejected. For example, when determining whether to execute or reject a given transaction, inputs to the machine learning system may be a geographic location of the user's last known valid transaction, an elapsed time since the user's last known valid transaction, any asynchronous speedometer data and/or similar movement data associated with the user's movement between locations during the time between the two transactions, any purchase history indicating a user's intention to travel to a certain location at a certain time, or similar data. An output of the machine learning system may be a prediction of whether the transaction is valid or fraudulent, and thus whether the transaction is to be executed or rejected, respectively.

More particularly, as shown by reference number 230, the machine learning system may apply the trained machine learning model 225 to a new observation, such as by receiving a new observation and inputting the new observation to the trained machine learning model 225. As shown, the new observation may include a first feature of Geo_N (e.g., a geographic location of the electronic exchange of information to be verified), a second feature of Time_N (e.g., a time at which the electronic exchange of information to be verified was initiated), a third feature of Exchange_N−1 (e.g., data associated with a prior electronic exchange of information, such as geographic data and/or time data associated with the prior electronic exchange of information), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "valid" for the target variable of whether the electronic exchange of information is a valid (e.g., non-fraudulent) electronic exchange of information for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, approving the request for the electronic exchange of information. The first automated action may include, for example, executing the electronic exchange of information. For example, if a user makes a first purchase using a transaction card in New York City, and twenty hours later attempts to make a second purchase using the transaction card in Japan, the machine learning model may recommend that the transaction be approved and/or the machine learning model may cause the transaction to be executed because the machine learning model may determine that it is feasible that a single user initiated both purchases since people can travel (e.g., via airplane) from New York City to Japan in under twenty hours.

As another example, if the machine learning system were to predict a value of "fraudulent" for the target variable of whether the electronic exchange of information is a valid (e.g., non-fraudulent) electronic exchange of information, then the machine learning system may provide a second (e.g., different) recommendation (e.g., declining the request for the electronic exchange of information) and/or may perform or cause performance of a second (e.g., different) automated action (e.g., rejecting the electronic exchange of information). For example, if a transaction card is used to make a first purchase in New York City, and five hours later attempts the transaction card is used to make a second purchase in Japan, the machine learning model may recommend that the transaction in Japan be declined and/or the machine learning model may cause the transaction in Japan to be rejected because the machine learning model may determine that it is not feasible that a single user initiated both purchases because people do not typically travel from New York City to Japan in five hours or less.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., valid electronic exchanges of information), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., fraudulent electronic exchanges of information), then the machine learning system may provide a second (e.g., different) recommendation, such as the second recommendation described above, and/or may perform or cause performance of a second (e.g., different) automated action, such as the second automated action described above.

As another example, if the machine learning system were to classify the new observation in a third cluster (e.g., suspicious and/or potentially fraudulent electronic exchanges of information), then the machine learning system may provide a third (e.g., different) recommendation, such as recommending collection of additional information to verify the electronic exchange of information, and/or may perform or cause performance of a third (e.g., different) automated action, such as prompting a verified user to approve the electronic exchange and/or to complete a two-factor authentication process before the electronic exchange of information is executed.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include outputs of the machine learning model (e.g., decisions regarding whether to validate certain electronic exchanges of information based on geographic data, time data, and/or similar data).

In this way, the machine learning system may apply a rigorous and automated process to verify electronic exchanges of information. The machine learning system may enable recognition and/or identification of tens, hundreds, thousands, or millions of features and/or feature values for tens, hundreds, thousands, or millions of observations, thereby increasing accuracy and consistency and reducing delay associated with verification of electronic exchanges of information relative to requiring computing resources to be allocated for tens, hundreds, or thousands of operators to manually verify electronic exchanges of information using the features or feature values.

As indicated above, FIG. 2 is provided as an example. Other examples may differ from what is described in connection with FIG. 2.

Figure 3:
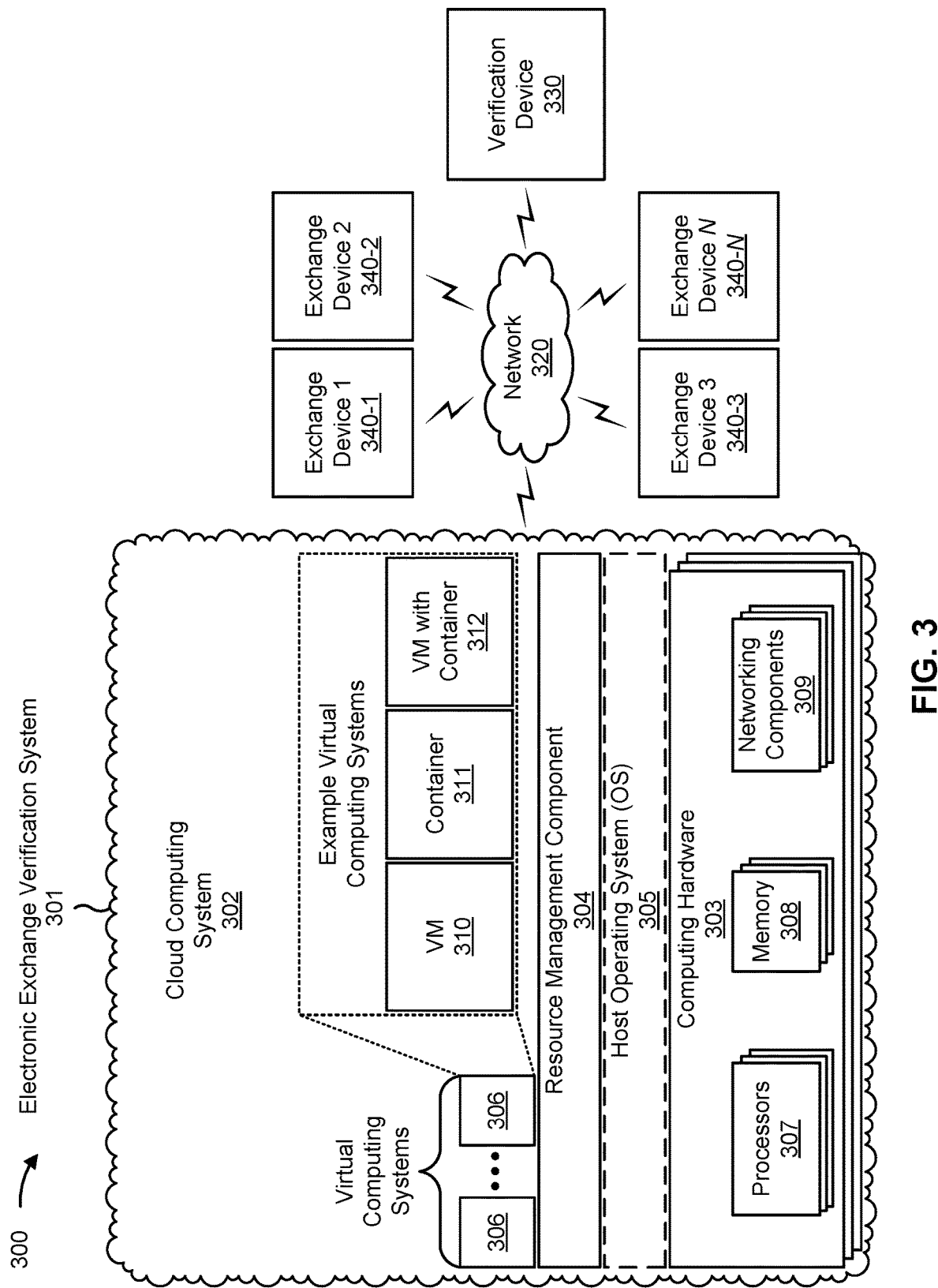
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an electronic exchange verification system 301, which may include one or more elements of and/or may execute within a cloud computing system 302. The cloud computing system 302 may include one or more elements 303-312, as described in more detail below. As further shown in FIG. 3, environment 300 may include a network 320, a verification device 330 (e.g., verification device 110, which may include a verification machine learning model, such as verification machine learning model 115), and/or one or more exchange devices 340 (e.g., exchange devices 105), shown as exchange device 1 340-1 through exchange device N 340-N. In some other implementations, the verification device 330 may alternatively be integral to, or otherwise associated with, the cloud computing system 302. For example, one or more of the virtual machines described herein may correspond to the verification device 330. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the electronic exchange verification system 301 may include one or more elements 303-312 of the cloud computing system 302, may execute within the cloud computing system 302, and/or may be hosted within the cloud computing system 302, in some implementations, the electronic exchange verification system 301 may not be cloud-based (e.g., may be implemented outside of a cloud computing system) or may be partially cloud-based. For example, the electronic exchange verification system 301 may include one or more devices that are not part of the cloud computing system 302, such as device 400 of FIG. 4, which may include a standalone server or another type of computing device. The electronic exchange verification system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The verification device 330 may include one or more devices configured to verify and/or validate electronic exchanges of information, such as electronic transactions and/or similar electronic exchanges of information. In some implementations, the verification device 330 may be configured to verify and/or validate electronic exchanges of information using a machine learning model, such as the verification machine learning model 115 described above in connection with FIGS. 1A-1C and/or the trained machine learning model 225 described above in connection with FIG. 2.

The exchange devices 340 may include one or more devices configured to facilitate an electronic exchange of information, such as an electronic transaction and/or a similar electronic exchange of information. In some implementations, the exchange devices 340 may include PoS terminals, personal computers, mobile devices, and/or similar devices configured to collect data associated with an electronic exchange of information, such as a card number, an account number, and/or similar information associated with electronic exchanges of information.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
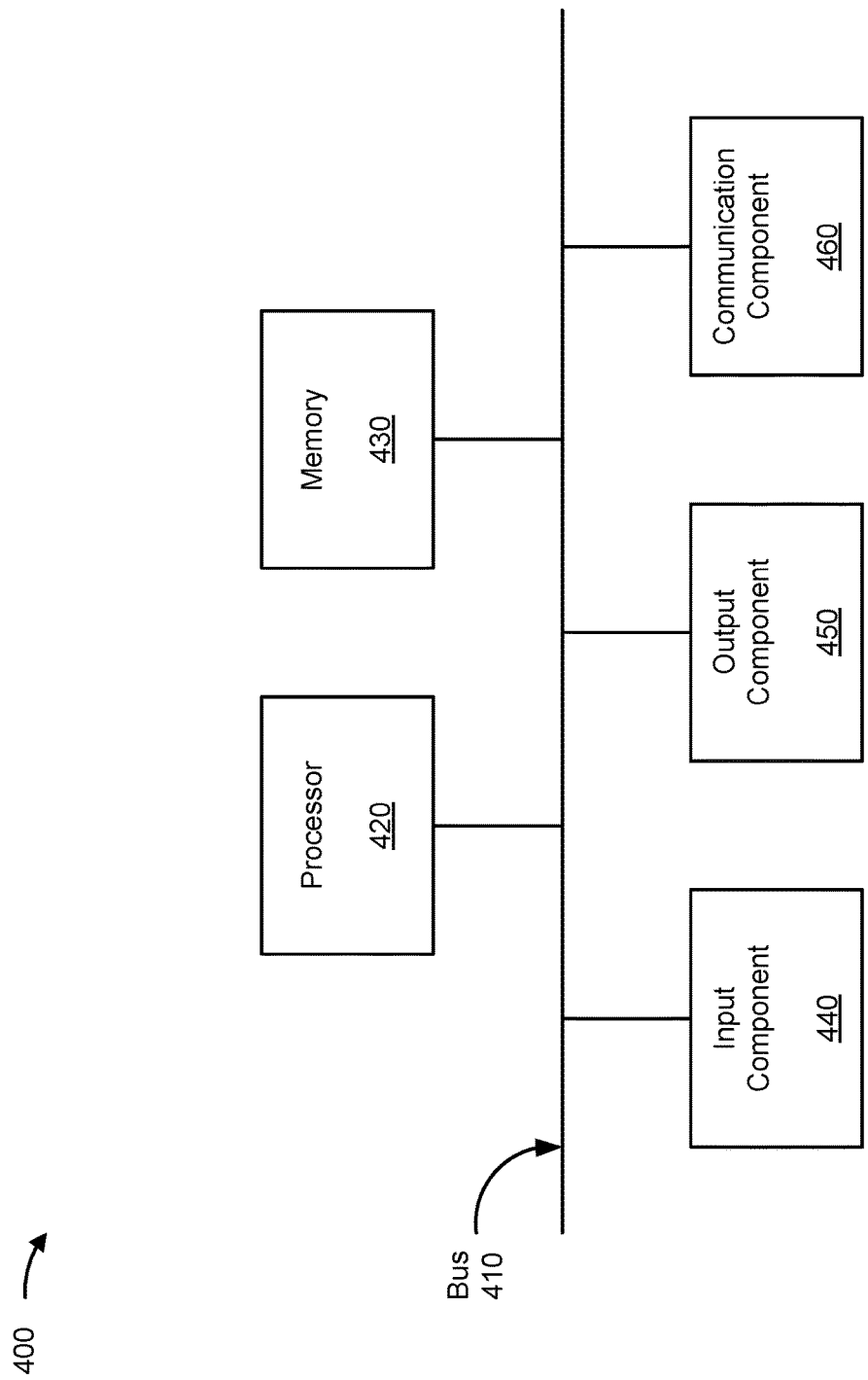
FIG. 4 is a diagram of example components of a device associated with dynamic verification of an electronic exchange of information, in accordance with some embodiments of the present disclosure.

FIG. 4 is a diagram of example components of a device 400 associated with dynamic verification of an electronic exchange of information. The device 400 may correspond to the exchange device 105 and/or the exchange device 340, the verification device 110 and/or the verification device 330, and/or a device associated with the cloud computing system 302. In some implementations, the exchange device 105 and/or the exchange device 340, the verification device 110 and/or the verification device 330, and/or a device associated with the cloud computing system 302 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with dynamic verification of an electronic exchange of information. In some implementations, one or more process blocks of FIG. 5 may be performed by the electronic exchange verification system (e.g., electronic exchange verification system 301). In some implementations, one or more process blocks of FIG. 5 may be performed by another device or a group of devices separate from or including the electronic exchange verification system, such as the exchange device 105 and/or exchange device 340, and/or the verification device 110 and/or the verification device 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a request for an electronic exchange of information (block 510). For example, the electronic exchange verification system (e.g., using processor 420, memory 430, input component 440, and/or communication component 460) may receive a request for an electronic exchange of information, as described above in connection with reference number 140 of FIG. 1B. As an example, the electronic exchange verification system 301 may receive a request to approve a purchase associated with a transaction card (e.g., a debit card, a credit card, a bank card, or a similar transaction card), such as in response to a user presenting a transaction card at a PoS terminal, a user entering transaction card details into an online marketplace, and/or the like.

As further shown in FIG. 5, process 500 may include receiving geographic location information associated with the request for the electronic exchange of information (block 520). For example, the electronic exchange verification system (e.g., using processor 420, memory 430, input component 440, and/or communication component 460) may receive geographic location information associated with the request for the electronic exchange of information, as described above in connection with reference number 140 of FIG. 1B. As an example, the electronic exchange verification system 301 may receive latitude and/or longitude information associated with a PoS terminal where a user presented a transaction card, an IP address associated with a personal computer, mobile device, or similar device used to initiate an electronic transaction, GNSS data from a mobile device used to initiate an electronic transaction, and/or similar geographic location information.

As further shown in FIG. 5, process 500 may include determining, using a machine learning model and based on the geographic location information, a validity of the request for the electronic exchange of information (block 530). For example, the electronic exchange verification system (e.g., using processor 420 and/or memory 430) may determine, using a machine learning model and based on the geographic location information, a validity of the request for the electronic exchange of information, as described above in connection with reference number 145 of FIG. 1B. As an example, the electronic exchange verification system 301, using a verification machine learning model (e.g., verification machine learning model 115) that may be trained using historical transaction data as described elsewhere herein, may determine whether a transaction is valid (e.g., initiated by an owner of the transaction card) or fraudulent (e.g., initiated by someone other than the owner of the transaction card).

As further shown in FIG. 5, process 500 may include determining whether to execute the electronic exchange of information based on the determination of the validity of the request for the electronic exchange of information (block 540). For example, the electronic exchange verification system (e.g., using processor 420 and/or memory 430) may determine whether to execute the electronic exchange of information based on the determination of the validity of the request for the electronic exchange of information, as described above in connection with reference number 150 of FIG. 1B. As an example, when, based on output from the verification machine learning model, the electronic exchange verification system 301 determines that the requested transaction is valid (e.g., non-fraudulent), the electronic exchange verification system 301 may determine that the transaction should be executed. Alternatively, when, based on output from the verification machine learning model, the electronic exchange verification system 301 determines that the requested transaction is not valid (e.g., fraudulent), the electronic exchange verification system 301 may determine that the transaction should not be executed.

As further shown in FIG. 5, process 500 may include performing one of executing the electronic exchange of information or rejecting the request for the electronic exchange of information based on the determination of whether to execute the electronic exchange of information (block 550). For example, the electronic exchange verification system (e.g., using processor 420 and/or memory 430) may perform one of executing the electronic exchange of information or rejecting the request for the electronic exchange of information based on the determination of whether to execute the electronic exchange of information, as described above in connection with reference number 165 of FIG. 1C. As an example, when the electronic exchange verification system 301 determines that the transaction should be executed, the electronic exchange verification system 301 may cause the transaction to be executed. Alternatively, when the electronic exchange verification system 301 determines that the transaction should not be executed, the electronic exchange verification system 301 may cause the transaction to be rejected, thereby preventing fraudulent transactions and thus conserving time, power, computing, and network resources otherwise required to reverse and/or correct invalid and/or fraudulent transactions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A system for verifying an electronic exchange of information, the system comprising:
one or more memories; and
one or more processors, communicatively coupled to the one or more memories, configured to:
train a machine learning model based on multiple sets of electronic exchanges of information data and geographic location data associated with the multiple sets of electronic exchanges of information data;
receive a request for the electronic exchange of information;
receive geographic location information associated with the request for the electronic exchange of information;
determine, using the machine learning model, based on the geographic location information, and based on a shape space associated with permitted electronic exchanges of information, a validity of the request for the electronic exchange of information, wherein a boundary of the shape space is reconfigurable based on a maximum velocity of available transportation;
determine whether to execute the electronic exchange of information based on the determination of the validity of the request for the electronic exchange of information; and
perform one of executing the electronic exchange of information or rejecting the request for the electronic exchange of information based on the determination of whether to execute the electronic exchange of information.

2. The system of claim 1, wherein the one or more processors are further configured to receive prior geographic location information associated with a prior electronic exchange of information, and
wherein the one or more processors, to determine whether to execute the electronic exchange of information, are configured to determine whether to execute the electronic exchange of information based on the prior geographic location information.

3. The system of claim 1, wherein the geographic location information is associated with one of a physical location of a point-of-sale device associated with the electronic exchange of information or an Internet protocol address corresponding to a device associated with the electronic exchange of information.

4. The system of claim 1, wherein the one or more processors are further configured to receive, from a telecommunication device associated with the request for the electronic exchange of information, movement information associated with a movement of the telecommunication device, and
wherein the one or more processors, to determine whether to execute the electronic exchange of information, are configured to determine whether to execute the electronic exchange of information based on the movement information.

5. The system of claim 1, wherein the one or more processors are further configured to receive time information associated with a time at which a prior electronic exchange of information was performed, and
wherein the one or more processors, to determine whether to execute the electronic exchange of information, are configured to determine whether to execute the electronic exchange of information based on the time information.

6. The system of claim 1, wherein the one or more processors are further configured to receive prior type information indicating a type of an electronic exchange of information associated with a prior electronic exchange of information, and
wherein the one or more processors, to determine whether to execute the electronic exchange of information, are configured to determine whether to execute the electronic exchange of information based on the prior type information.

7. The system of claim 1, wherein the one or more processors are further configured to identify the shape space associated with the permitted electronic exchanges of information.

8. The system of claim 7, wherein the one or more processors are further configured to:
receive time information associated with a time at which a prior electronic exchange of information was performed; and
reconfigure the boundary of the shape space associated with the permitted electronic exchanges of information based on the time information.

9. A method for verifying an electronic exchange of information, comprising:
receiving, by a verification device, a request for the electronic exchange of information;
receiving, by the verification device, geographic location information associated with the request for the electronic exchange of information;
determining, using a machine learning model, based on the geographic location information, and based on a shape space associated with permitted electronic exchanges of information, a validity of the request for the electronic exchange of information, wherein a boundary of the shape space is reconfigurable based on a maximum velocity of available transportation;
determining, by the verification device, whether to execute the electronic exchange of information based on the determination of the validity of the request for the electronic exchange of information; and
performing, by the verification device, one of executing the electronic exchange of information or rejecting the request for the electronic exchange of information based on the determination of whether to execute the electronic exchange of information.

10. The method of claim 9, further comprising training, by the verification device, the machine learning model based on multiple sets of electronic exchanges of information data and geographic location data associated with the multiple sets of electronic exchanges of information data.

11. The method of claim 9, further comprising receiving prior geographic location information associated with a prior electronic exchange of information,
wherein determining whether to execute the electronic exchange of information comprises determining whether to execute the electronic exchange of information based on the prior geographic location information.

12. The method of claim 9, wherein the geographic location information is associated with one of a physical location of a point-of-sale device associated with the electronic exchange of information or an Internet protocol address corresponding to a device associated with the electronic exchange of information.

13. The method of claim 9, further comprising receiving, from a telecommunication device associated with the request for the electronic exchange of information, movement information associated with a movement of the telecommunication device,
 wherein determining whether to execute the electronic exchange of information comprises determining whether to execute the electronic exchange of information based on the movement information.

14. The method of claim 9, further comprising receiving time information associated with a time at which a prior electronic exchange of information was performed,
 wherein determining whether to execute the electronic exchange of information comprises determining whether to execute the electronic exchange of information based on the time information.

15. The method of claim 9, further comprising receiving prior type information indicating a type of an electronic exchange of information associated with a prior electronic exchange of information,
 wherein determining whether to execute the electronic exchange of information comprises determining whether to execute the electronic exchange of information based on the prior type information.

16. The method of claim 9, further comprising identifying the shape space associated with the permitted electronic exchanges of information.

17. The method of claim 16, further comprising:
 receiving time information associated with a time at which a prior electronic exchange of information was performed; and
 reconfiguring the boundary of the shape space associated with the permitted electronic exchanges of information based on the time information.

18. A non-transitory computer-readable medium storing a set of instructions, the set of instructions comprising:
 one or more instructions that, when executed by one or more processors of a verification device, cause the verification device to:
  receive a request for an electronic exchange of information;
  receive geographic location information associated with the request for the electronic exchange of information;
  determine, using a machine learning model, based on the geographic location information, and based on a shape space associated with permitted electronic exchanges of information, a validity of the request for the electronic exchange of information, wherein a boundary of the shape space is reconfigurable based on a maximum velocity of available transportation;
  determine whether to execute the electronic exchange of information based on the determination of the validity of the request for the electronic exchange of information; and
  perform one of executing the electronic exchange of information or rejecting the request for the electronic exchange of information based on the determination of whether to execute the electronic exchange of information.

19. The non-transitory computer-readable medium of claim 18, wherein the one or more instructions further cause the verification device to train the machine learning model based on multiple sets of electronic exchanges of information data and geographic location data associated with the multiple sets of electronic exchanges of information data.

20. The non-transitory computer-readable medium of claim 18, wherein the one or more instructions further cause the verification device to receive additional information associated with the request for the electronic exchange of information, the additional information comprising at least one of:
 prior geographic location information associated with a prior electronic exchange of information,
 movement information associated with a movement of a telecommunication device associated with the request for the electronic exchange of information,
 time information associated with a time at which the prior electronic exchange of information was performed, or
 prior type information indicating a type of an electronic exchange of information associated with the prior electronic exchange of information, and
 wherein the one or more instructions, that cause the verification device to determine whether to execute the electronic exchange of information, cause the verification device to determine whether to execute the electronic exchange of information based on the additional information.

* * * * *